United States Patent [19]

Gunji et al.

[11] Patent Number: 5,068,070
[45] Date of Patent: Nov. 26, 1991

[54] PROCESS FOR MAKING FILM

[75] Inventors: Akihiko Gunji; Tetsuya Masuki, both of Ichigai; Hidenori Shirai, Utsunomiya, all of Japan

[73] Assignee: Kao Corporation, Tokyo, Japan

[21] Appl. No.: 415,661

[22] Filed: Oct. 2, 1989

[30] Foreign Application Priority Data

Oct. 12, 1988 [JP] Japan .................. 63-256455

[51] Int. Cl.$^5$ .................. B29C 55/20
[52] U.S. Cl. .................. 264/41; 264/564; 264/146; 264/290.2; 264/DIG. 47; 425/326.1
[58] Field of Search .................. 264/564-569, 264/288.8, 290.2, 41, 146, DIG. 47; 425/326.1, 327

[56] References Cited

U.S. PATENT DOCUMENTS

| 3,398,432 | 8/1968 | Quackenbush et al. | 425/327 |
| 3,634,564 | 1/1972 | Okamoto et al. | 264/288.8 |
| 4,585,604 | 4/1986 | Okuyama et al. | 264/288.8 |
| 4,793,956 | 12/1988 | Nogiwa et al. | 264/288.8 |
| 4,794,128 | 12/1988 | Kawaguchi et al. | 264/288.8 |
| 4,814,124 | 3/1989 | Aoyama et al. | 264/288.8 |
| 4,829,096 | 5/1989 | Kitamura et al. | 264/288.8 |

FOREIGN PATENT DOCUMENTS

| 57-47334 | 3/1982 | Japan . | |
| 62-253635 | 11/1987 | Japan | 264/288.8 |
| 62-280233 | 12/1987 | Japan . | |
| 62-280234 | 12/1987 | Japan . | |
| 62-280235 | 12/1987 | Japan . | |

Primary Examiner—Jeffery Thurlow
Attorney, Agent, or Firm—Birch, Stewart, Kolasch & Birch

[57] ABSTRACT

A process for making a film including forming a composite material of a thermoplastic film into an annular original film having at least two thick portions according to the inflation process, making the annular original film into a flat shape such that the thick portions are located at substantially opposite ends thereof, and stretching the flat annular original film by clamping the thick portions.

5 Claims, 3 Drawing Sheets

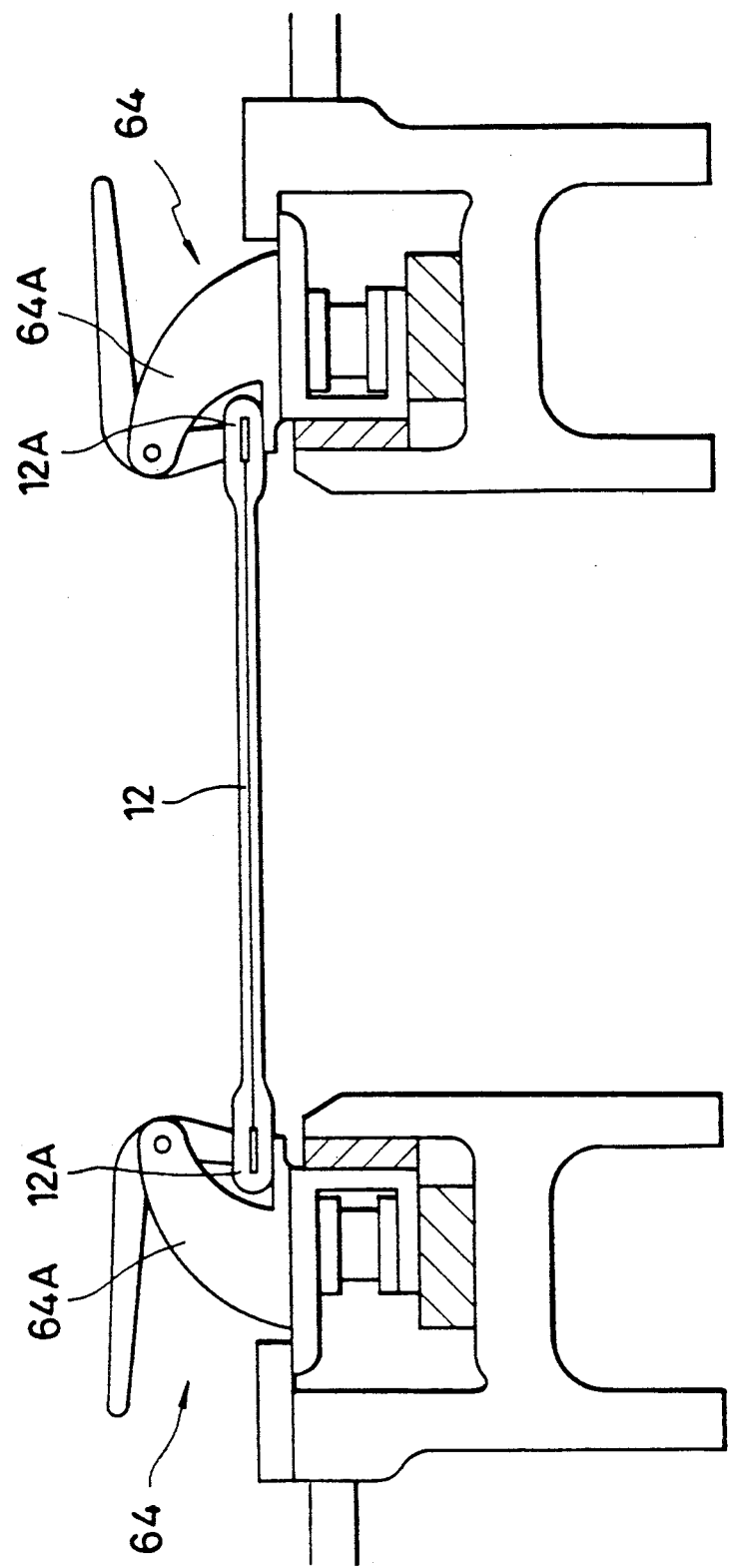

PROCESS FOR MAKING FILM

BACKGROUND OF THE INVENTION

1. Field of the Invention

This invention relates to a process for making a film comprising a combination of a film making process, an inflation process for molding an annular original film, a tenter process for stretching the annular original film in the width direction, and particularly to a process for making a film in which a porous film suitable to be used as a raw material of disposable sanitary goods, such as a paper diaper or the like, can be made at a low cost and with ease.

2. Description of the Prior Art

As a representative process of a horizontal stretching or biaxial stretching of a film or a sheet (hereinafter represented by the "film"), there have heretofore been a tenter process or a flat process (hereinafter represented by the "tenter process") and a tubular process (hereinafter including the "mandrel process"). There are also processes for molding an original film suitable for the respective stretching processes.

As a process for forming an original film when the film is stretched in accordance with the tenter process, a die process for forming a flat film, a casting process, or a flat process (hereinafter represented by the "T-die process") is adopted. Similarly, as a process for forming an original film when the film is stretched in accordance with the tubular process, an inflation process for forming an annular film is adopted.

The tenter process is a process in which the entire film is uniformly stretched by clamping both ends of a wide film. As the quality of a film stretched in accordance with the tenter process depends on the accuracy of the thickness before the film is stretched, the T-die process having a very high accuracy in thickness of the film is adopted for forming an original film. However, the equipment cost of the T-die process molding apparatus is high compared with the inflation molding apparatus.

On the other hand, the tubular process is a process in which an annular original film is stretched in accordance with the inflation process utilizing the sealing pressure of air which is to be charged into a tube. The tubular process has a strong correlation with respect to the vertical and horizontal stretch ratio. Therefore, there exists such a problem that the vertical and horizontal stretch ratio of a film stretched in accordance with the tubular process are difficult to obtain be set to desired optional results.

Also, as a process for making a porous film or a porous sheet (hereinafter represented by the "porous film") among films, there is a process for making a porous film having a membrane structure (communicating hole structure) by forming an original film by dispersing an inorganic or organic filler in a resin raw material which will act as a base, and thereafter this original film is stretched to generate cracks around the filler as a core.

However, when a porous film is to be made according to the above-mentioned process, selection of fillers to be dispersed in the resin and contents thereof become important factors in making such a porous film. In addition, a process for molding an original film and a process for stretching the same also become very important factors. Accordingly, the selection of these factors in the process for making a porous film becomes important in determining the physical properties of the porous film. Particularly, when a porous film having a large horizontal strength is to be obtained, a horizontal stretching or a biaxial stretching is required. In this case, a process for molding the original film becomes particularly important.

When an original film is to be molded in accordance with the inflation process, the conventional process for molding an original film is limited to the tubular process or the mandrel process in which a film is stretched in its annular shape. Similarly, when a flat-shaped original film is to be molded in accordance with the T-die process, it is limited to the tenter process in which a film is stretched in its flat-shape. Particularly, with an inexpensive porous film employed in sanitary goods, such as a paper diaper or the like, the film is stretched in the horizontal direction in order to increase strength in the horizontal direction. In this case, there is a correlation between the molding process and the stretching process. Regarding the annular original film containing a filler and a flat original film containing a filler, a porous film has been made by means of a combination of the above-mentioned molding process and stretching process. This can be seen with respect to a stretching process which is described in Japanese Patent Publication No. Sho 60-26009.

In this way, it has been commonly known that the mandrel process is applied to the annular original film which is made in accordance with the inflation process and the T-die process is applied to the flat original film which is obtained in accordance with the T-die process.

Accordingly, the physical properties of films obtained by the respective processes have their own characteristics. On the other hand, in the above-mentioned combined process, a target property of a film is difficult to set due to its nature and there can be obtained a film of limited physical properties depending on the respective processes for molding the original film. Particularly, in a case of an original film obtained in accordance with the inflation process, a correlation between the horizontal stretch ratio and the vertical stretching multiple factors is significant and optional results are difficult to obtain, as mentioned above.

SUMMARY OF THE INVENTION

It is, therefore, a first object of the present invention to provide a process for making film in which even an original film having an irregular thickness according to the inflation process can be made into a film having a uniform thickness and well-balanced vertical and horizontal strengths in accordance with the tenter process and in which a film can be made at a low cost and with ease.

A second object of the present invention is to provide a process for making a film in which a porous film suitable particularly to a raw material of disposable sanitary goods, such as a paper diaper or the like, can be made into a film having an uniform thickness and well-balanced vertical and horizontal strengths in accordance with the tenter process, even if the original film has irregular thickness in accordance with the inflation process, and in which a porous film can be made at a low cost and with ease.

The objects of the present invention can be achieved by providing a process for making a film comprising the steps of forming an annular original film from a composite material of a thermoplastic film having at least two thick portions according to the inflation process, making the annular original film into a flat shape such that the thick portions are located at substantially both ends thereof, and stretching the flat annular original film by clamping the thick portions.

According to a process for making a film, first, an annular original film having at least two thick portions is made from a composite material of a thermoplastic film in accordance with the inflation process. By forming at least two thick portions in this way, a rupture strength with respect to a pulling out force of the film can be increased, and the portion of the original film other than the thick portions, i.e., the portion which is desired to be obtained as a stretched film is formed as a thin portion of the film. In this way, the film can be stretched in accordance with the tenter process. In other words, the most significant feature of the present invention is in that the tenter process, which is considered to be applicable only to an original film having a uniform thickness according to heretofore understood manufacturing techniques, is boldly applied to an original film having thick portions.

The thickness of the thick portion is greater by at least 110% or more than the thickness of the thin portion and more preferably, in a range of from 125 to 350% of the thickness of the thin portion.

According to the process of the present invention, the annular original film is made into a flat-shape so that the thick portions are located at substantially both end portions of the film. That is, when the annular original film molded in accordance with the inflation process is folded or collapsed to form a flat-shape, attention is paid such that the thick portions would come to the substantially both end portions. The term "substantially" used here means that the thick portions are not necessarily exactly located at both ends of the film, but that they may be generally at both ends so that the thick portions would not interfere with the finishing process of the film.

According to the process of the present invention, a flattened annular original film is stretched by clamping the thick portions.

That is, when the flattened annular original film is to be stretched in accordance with the tenter process, the thick portions located at both ends of the flattened film are clamped by a clamping portion of a stretching apparatus. Accordingly, the portion which is to be stretched in accordance with the tenter process is the thin portion of the film excluding the thick portions.

Of course, it goes without saying that according to the process of the present invention, the annular original film may be subjected to a uniaxial stretching treatment beforehand by means of a roll or the like before the annular original film is stretched in accordance with the tenter process.

As a composite material forming the thermoplastic film used in the process of the present invention, there can be listed a resin of a polyolefin system. The resin includes those which contain, as a chief component, mono-olefin polymer and copolymer such as ethylene, propylene, butene, styrene, etc. There can be listed general thermoplastic resins such as, for example, high density polyethylene, linear low density polyethylene, polypropylene, ethylene-propylene copolymer, polybutene, ethylene-vinyl acetate copolymer, polyvinyl chloride, polyethyleneterephthalate, polyamide and a mixture thereof. Particularly, when a porous film is to be made, there can be obtained a graceful and stiff porous film by using a linear low density polyethylene.

Also, when a porous film, which is suitable to a raw material of a disposable sanitary goods, such as a paper diaper or the like, is to be made, a resin raw material is added with a filler and the resultant film has added a third component for rendering a flexibility function. As a preferable filler, there are used inorganic and organic fillers. As an inorganic filler, there are used calcium carbonate, barium carbonate, magnesium carbonate, barium sulfate, magnesium sulfate, gypsum, talc, clay, kaolin, silica, diatomaceous earth, zinc oxide, titanium oxide, alumina, mica, zeolite, carbon black, etc. As an organic filler, there are used wood powder, pulp powder, and resin powder having a higher melting point than the polyolefin resin raw material which is used as a base, for example, powder of polyethyleneterephthalate, etc. when a linear low density polyethylene is used as a base resin. These may be used either alone or as a mixture.

The average diameter of the fillers is preferably $30\mu$ or less, and more preferably $10\mu$ or less and most preferably in a range from 0.5 to $5.0\mu$.

Surface treatment of the filler is important in view of a uniform dispersion in the resin. As such a surface treating agent, one such as a fatty acid or its metal salt, which can dehydrate the surface, is preferable. Regarding this surface treatment, a filler already subjected to surface treatment may be used or otherwise the filler can be subjected to inline processing by means of kneading with the surface treating agent at one stage for uniformly dispersing a raw material.

Also, when a porous film is to be obtained by containing a filler, the compounding ratio of the thermoplastic resin and the filler is from 30 to 500 wt. parts of the filler against 100 wt. parts of a thermoplastic resin and preferably 100 to 300 wt. parts of a filler against 100 wt. parts of a thermoplastic resin. The upper limit of the compounding ratio of the filler has a direct relation with the strength, whereas the lower limit thereof has a direct relation with the membrane structure and if within this range, a membrane structure can be made with ease by stretching and the strength of the film can be maintained in the end product.

Furthermore, as a preferred third component that is used in order to render flexibility to a porous film or to prevent a rustling sound, there can be used compounds such as hydropolybutadiene and isoprene, as described in Japanese Patent Publication No. Sho 57-47334, or polyester obtained from polybasic acid and polybasic alcohol, as described in Japanese Patent Early Laid-open Publication No. Sho 62-280233, or compounds, rubber-like resins and other components, as described in Japanese Patent Early Laid-open Publication No. Sho 62-280234 and Japanese Patent Early Laid-open Publication No. Sho 62-280235. These can be added in accordance with the necessity. These components can be suitably selected in accordance with use of the film. The quantity of these component added may be determined in accordance with the purpose. Usually, the quantity of the third component is preferably from 50 wt. parts or less against 100 wt. parts of the thermoplastic resin.

BRIEF DESCRIPTION OF THE DRAWINGS

FIG. 3 is a sectional view showing a portion for clamping a film on a stretching apparatus according to a tenter method of FIG. 1.

DETAILED DESCRIPTION OF THE PREFERRED EMBODIMENT

One embodiment of an apparatus for making a film which is suitably used for carrying out the process of the present invention and one mode for carrying out the process of the present invention will be described with reference to FIGS. 1 through 3.

Figure 1:
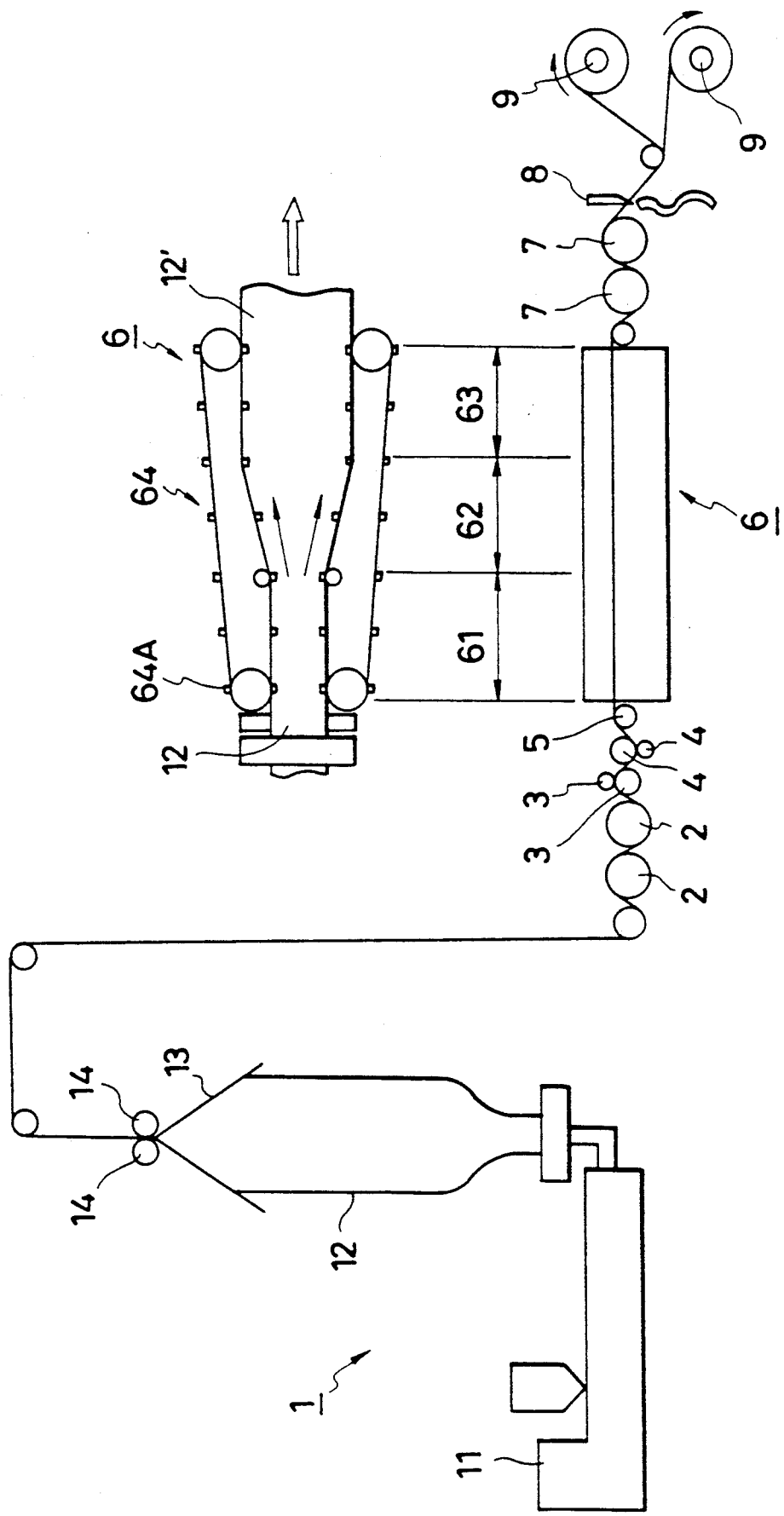
FIG. 1 is a view showing a whole construction of a film making apparatus used in one mode for carrying out the process of the present invention.
Figure 2:
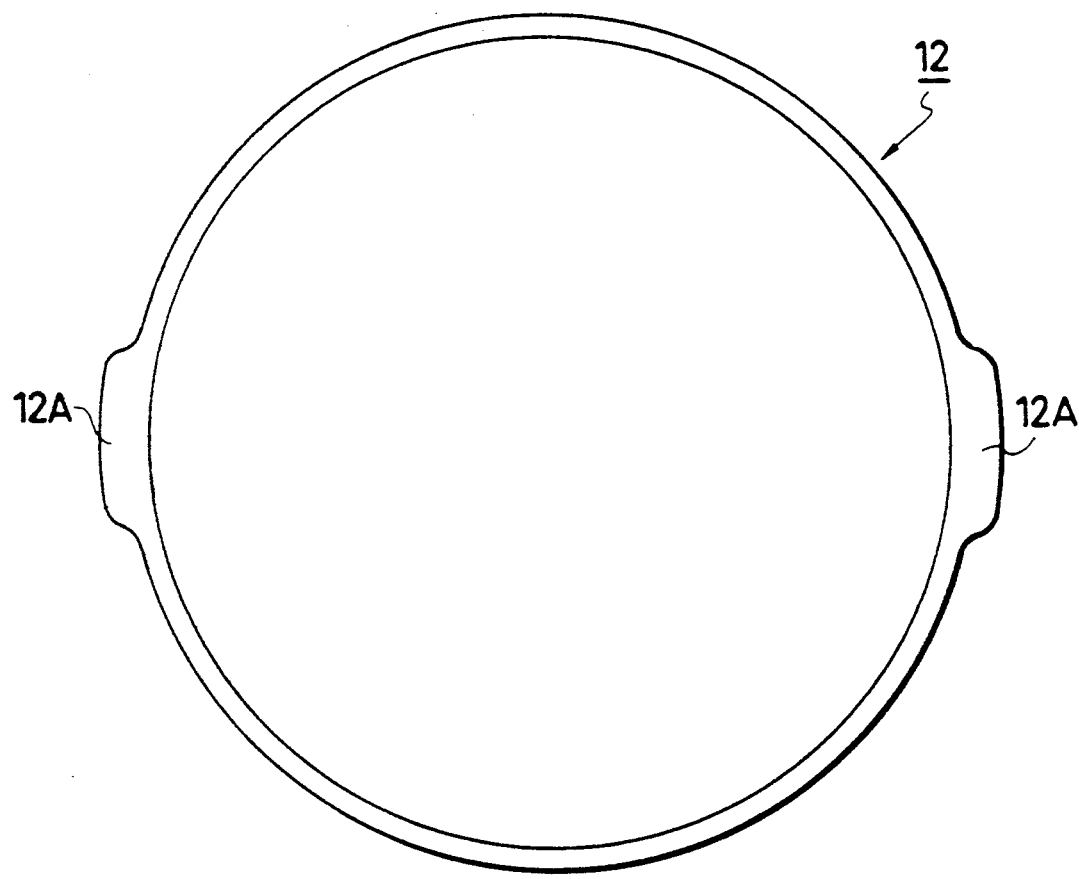
FIG. 2 is a sectional view showing an annular original film which is formed by an inflation molding apparatus.

An inflation molding apparatus 1, as shown in FIG. 1, is designed as such that a thermoplastic resin in its molten state is extruded in such a manner as to form thick portions 12A, 12A at two places to form an annular original film 12, as shown in FIG. 2 and thereafter, the annular original film 12 is passed through a guide plate 13 and is made flat by a pair of nip rolls 14, 14 and pulled out.

As a process for molding thick portions 12A, 12A on the annular original film 12 by the inflation die 11, there is a process for partially widening a lip clearance in the inflation die 11, a process for partially cooling resin during a period of time when the resin which came out of the inflation die 11 is being hardened or a process of co-extrusion molding.

On a downstream side of the inflation molding apparatus 1, there are arranged a pair of preheating rolls 2, 2, a pair of low speed nip rolls 3, 3, a pair of high speed nip rolls 4,4, and a pair of cooling rolls 5, 5 in this order.

That is, the annular original film 12 formed in a flat shape (hereinafter referred to as the "flat film 12" just for convenient purpose), which is formed in a flat shape by the nip rollers 14, 14 of the inflation molding apparatus 1, is heated to a temperature in which the film 12 can be stretched by the preheating rolls 2, 2, and is then subjected to an uniaxial stretching treatment in the flowing direction (vertical direction) of the annular original film 12 between the pair of low speed nip rolls 3, 3 and between the pair of the high speed nip rolls 4, 4 owing to differeneces in speed of rotation thereof. After being subjected to the uniaxial stretching treatment in the vertical direction, the flat film 12 is cooled by the cooling roll 5 and delivered to a tenter process stretching apparatus 6.

The tenter process stretching apparatus 6, as shown in FIG. 1 and FIG. 3, includes a heating portion 61 for heating the flat film 12 to a temperature suitable for the film 12 to be stretched, a horizontal stretching portion 62 for stretching the heated flat film 12 in the lateral direction (width direction), and a heat processing portion 63 for removing stress remained in the stretched flat film 12, all arranged in this order. A pair of clamping portions 64, 64 for clamping the flat film 12 is disposed on both sides thereof. The flat film 12 is transferred by a plurality of clips 64A, 64A disposed on each of the clamping portions 64, 64.

On a downstream side of the tenter process stretching apparatus 6, there are disposed a pair of cooling rolls 7, 7 for receiving and cooling the heat processed flat film 12, a knife 8 for cutting both end portions of the cooled flat film 12 and for removing the thick portions 12A, 12A, and a pair of takeup apparatuses 9, 9 for taking up the flat film 12, as two films 12', 12', from which the thick portions 12A, 12A have been removed, all arranged in this order.

Operation of one mode for carrying out the process of the present invention in which the above-mentioned film making apparatus is used will now be described.

The annular original film 12 molded by the inflation die 11 of the inflation molding apparatus 1 is folded in such a manner as to form a flat shape by a pair of receiving rolls 14, 14 of the inflation molding apparatus 1. The flat film 12 is preheated to a proper temperature by the preheating rolls 2, 2, then uniaxially stretched in the vertical direction between the low speed nip rolls 33 and between the high speed nip rolls 4, 4 as a roll stretching machine and is then cooled by the cooling roll 5. Successively, the flat film 12 is introduced to a pair of clips 64A, 64A, etc. of the clamping portion in the tenter stretching apparatus 6. At this time, the film 12 is preheated and cooled by the preheating rolls 2, 2 and the cooling roll 5 before and after the stretching process in this embodiment. The conditions for preheating and cooling the flat film 12 may be selected from those suitable for the resin material as the base of the film 12.

Then, the flat film 12, which is clamped at its both ends by the clips 64A, 64A of the tenter process stretching apparatus 6, is heated by the preheating portion 61 to a temperature suitable for the film 12 to be stretched and thereafter the heated flat film 12, which is still clamped at its ends by the clips 64A, 64A of the stretching portion 62, is subjected to a horizontal stretching treatment. After stretched, its remaining stress is removed by the heat processing portion 63 while maintaining the film 12 clamped by the clips 64A, 64A of the tenter process stretching apparatus 6. Thereafter, the flat film 12 is released from the clips 64A, 64A and cooled by the cooling rolls 7, 7. Then the thick portions 12A, 12A at both ends of the flat film 12 are removed by the knife 8 to obtain two films 12', 12'. Then, the films 12' and 12' are separately taken up by the takeup apparatuses 9, 9, respectively. Also, at this time, by recovering the removed thick portions 12A, 12A, they can be reused as a raw material for the inflation molding apparatus 1.

The most suitable temperature of the flat film 12 during the process from the preheating rolls 2, 2 of the roll expansion to the heat processing portion 61 of the tenter process stretching apparatus 6 is different depending on a resin material as a base of the film. In general, however, it is preferably lower by 20° C. or more than the melting point of the raw material resin.

PREFERRED EMBODIMENTS

Next, the process of the present invention will be described concretely with reference to the following embodiments in which the film making apparatus of FIG. 1 is used. Particularly, in the process of these embodiments, there is used a polyethylene resin which is generally considered to be unsuitable to the tenter process expansion.

It is to be understood, however, that the process of the present invention is not limited to the following embodiments.

In the embodiment and comparison example set forth hereunder, there were used a polyethylene resin, a filler and a third component which are shown in the following table 1.

TABLE 1

| | Used Material | |
|---|---|---|
| | Abbreviation | Name |
| Polyethy- | A1 | Ultozex 1020L |
| lene resin | A2 | Ultozex 2021L |
| | A3 | Ultozex 3021L |
| Filler | B1 | Liton BS-O |
| Third | C1 | Polyester (TMP/AA/ST = 2/1/4) |
| component | C2 | Polyester (TMP/DA/ST = 2/1/4) |

Note:
Filler: Potassium Carbonate
A1, A2, A3: Manufactured by Mitsui Sekiyu Kagaku Kogyo K.K.
B1: Manufactured by Bihokufun Kagaku Kogyo K.K.

Regarding the third component, supplementary matters are shown in table 2.

TABLE 2

| Third Component | | | | |
|---|---|---|---|---|
| Composition of third component and its ratio | SV | AB | OHV | CTN |
| C1 Polyester (TMP/AA/ST = 2/1/4) | 240 | 1.5 | 9.9 | 90 |
| C1 Polyester (TMO/DA/ST = 2/1/4) | 185 | 9.4 | 19.2 | 120 |

Note:
SV: saponification value, AV: acid value, OHV: hydroxide value, TCN: total carbon number, TMP: trimethyrolpropane, AA: adipic acid, ST: stearic acid (KAO LUNAC S-40), DA: dimer acid (UNION CAMP, INC., UNIDIME 22)

Also, the compounding ratio of the composite materials in which the raw materials of table 1 are used in this embodiment and comparison example is shown in table 3.

TABLE 3

| Compounding composite material | Compounding Composition | | |
|---|---|---|---|
| | Polyethylene resin (wt. part) | Filler (wt. part) | Third component (wt. part) |
| No. 1 | A1 (100) | | |
| No. 2 | A2 (100) | B1 (125) | |
| No. 3 | A2 (100) | B1 (150) | C1 (20) |
| No. 4 | A3 (100) | B1 (150) | C2 (20) |

EMBODIMENT 1

The compounding composite material No. 1 was melt molded according to the inflation process to obtain an annular original film having an average thickness of 70μ at a portion of a normal thickness and having a thick portion of 110μ. Such obtained film was stretched according to the sequential biaxial stretching process shown in FIG. 1 under the following stretching conditions.
Film width (after stretched): '800 mm×2 sheets
① takeup speed: 30 m/min.
② condition of vertical stretching (=roll stretching)
Preheating temperature: 90° C.
Stretching temperature: 85° C.
Stretching multiple factor: 1.5 times
③ condition of horizontal stretching (=tenter stretching)
Preheating temperature: 90° C.
Stretching temperature: 90° C.
Stretching multiple factor: 4.0 times
Abilities of the film obtained under above-mentioned conditions are shown in table 4.

EMBODIMENT 2

After the compounding composite material No. 2 containing fillers shown in table 3 was kneaded, a porous film was obtained by the same process as the EMBODIMENT 1. Abilities of such obtained porous film is shown in table 4. However, in this case, the horizontal multiple factor was set to 2.8 times.

EMBODIMENT 3

A porous film was obtained under the same conditions as EMBODIMENT 2 except that the vertical stretching of EMBODIMENT 2 was not performed (multiple factor of the vertical stretching was 1.0 times) and the multiple factor of the horizontal stretching was set to 4.8 times. Abilities of such obtained porous film are shown in table 4.

EMBODIMENT 4

A porous film was obtained under the same conditions as EMBODIMENT 1 except that the compounding composite materials No. 2 of EMBODIMENT 2 were changed to the compounding composite materials No. 3, the condition of the vertical stretching was set as preheating temperature: 80° C. and stretching temperature: 60° C., and the condition of the horizontal stretching was set as preheating temperature 80° C., stretching temperature: 65° C. and stretching multiple factor: 2.5 times. Abilities of such obtained are shown in table 4.

EMBODIMENT 5

The vertical stretching of EMBODIMENT 4 was not performed (vertical stretching multiple factor was 1.0 times) and the horizontal stretching multiple factor was set to 4.0 times) to obtain a porous film. Abilities of such obtained porous film are shown in table 4.

EMBODIMENT 6

A porous film was obtained under the same conditions as EXAMPLE 4 except that the compounding composite materials No. 2 of EXAMPLE 4 were changed to the compounding composite materials No. 4, the vertical stretching multiple factor was set to 1.3 times and the horizontal stretching multiple factor was set to 2.8 times. Abilities of such obtained porous film are shown in table 4.

EMBODIMENT 7

A porous film was obtained under the same conditions as EXAMPLE 6 except that the vertical stretching of EXAMPLE 6 was not performed (vertical stretching multiple factor was 1.0 times) and the horizontal stretching multiple factor was set to 4.0 times. Abilities of such obtained porous film are shown in table 4.

COMPARISON EXAMPLE 1

We attempted to obtain a stretched film using the compounding composite material No. 1 containing no filler in the same manner as EMBODIMENT 1 except that a normal inflation molded film which is not provided with the thick portions and which has an average thickness of 70μ is used as an original.

COMPARISON EXAMPLE 2

A film was obtained under the same conditions as EMBODIMENT 1 except that an original formed from the compounding composite material No. 1 in the same manner as COMPARISON EXAMPLE 1 was used and the horizontal stretching multiple factor was set to 1.8. Abilities of such obtained film are shown in table 4.

COMPARISON EXAMPLE 3

We attempted to obtain a film in the exactly same manner as EMBODIMENT 2 except that the compounding composite material No. 1 was changed to the compounding composite material No. 2 containing a filler and after the compounding composite material No. 2 was uniformly kneaded, a normal inflation molding film having an average thickness of 70μ was used as an original.

COMPARISON EXAMPLE 4

A porous film was obtained in the same manner as EMBODIMENT 3 except that the horizontal stretching multiple factor was set to 1.8. Abilities of such obtained porous film are shown in table 4.

COMPARISON EXAMPLE 5

We attempted to obtain a porous film under the exactly same stretching conditions as EMBODIMENT 3 except that the original film was formed under the same conditions as COMPARISON EXAMPLE 3.

COMPARISON EXAMPLE 6

We attempted to obtain a porous film by stretching a film under the exactly same condition as EMBODIMENT 4 except that the compounding composite material No. 2 was changed to the compounding composite material No. 3 and the original film was formed under the same conditions as COMPARISON EXAMPLE 3.

COMPARISON EXAMPLE 7

A porous film was obtained in the exactly same manner as COMPARISON EXAMPLE 6 except that the horizontal stretching multiple factor was set to 1.7. Abilities of such obtained porous film are shown in table 4.

COMPARISON EXAMPLE 8

We attempted to obtain a porous film under the exactly same stretching conditions as EMBODIMENT 5 except that the original film was formed under the same conditions as COMPARISON EXAMPLE 6.

TABLE 4

| | Ability Comparison | | | | |
|---|---|---|---|---|---|
| | water-vapor permeability | vertical tear strength | horizontal tear strength | flexibility | stretch irregularity |
| embodiment 1 | | 321 | 305 | A | A |
| embodiment 2 | 2.55 | 215 | 210 | A | A |
| embodiment 3 | 2.22 | 357 | 232 | A | A |
| embodiment 4 | 2.43 | 278 | 263 | A | A |
| embodiment | 2.19 | 389 | 203 | A | A |
| embodiment | 2.41 | 304 | 270 | A | A |
| embodiment | 2.12 | 377 | 213 | A | A |
| comp. example 1 | | | | | unable to process |
| comp. example 2 | | 280 | 378 | C | C |
| comp. example 3 | | | | | unable to process |
| comp. example 4 | 1.63 | 208 | 352 | C | C |
| comp. example 5 | | | | | unable to process |
| comp. example 6 | | | | | unable to process |
| comp. example 7 | 1.53 | 206 | 339 | B | B |
| comp. example 8 | | | | | unable to process |

Tests for water vapor permeability, vertical and horizontal tear strengths, flexibility and stretch irregularity of table 4 were carried out under the following conditions. However, measurement of the water-vapor permeability was not carried out for EMBODIMENT 1 AND COMPARISON EXAMPLES 1 and 2 because a porous film could not be obtained due to no filler contained.

| | |
|---|---|
| water-vapor permeability: | measured according to JIS Z-0208 unit is g/100 m² · hr |
| vertical and horizontal tear strength: | measured according to JIS P-8116 g/50μ thickness (strength converted when the film thickness is 50μ) |
| flexibility: sensor evaluation | A = very flexible<br>B = flexible<br>C = hard |
| stretch irregularity: appearance evaluation | A = uniform<br>B = some irregularities<br>C = many irregularities |

The following things are known from the results shown in the table 4.

By forming the thick portions, it is apparent that the original film according to the inflation process can be uniformly stretched according to the tenter process. When an annular original film is stretched according to the normal inflation process, the film is ruptured (see COMPARISON EXAMPLE 1) or stretch irregularities are remained (see COMPARISON EXAMPLE 2) for restraining the stretching before the film is ruptured. The result is that flexibility as its characteristic is spoiled in spite of the fact that a polyethylene resin was used for the film. Also, such film having irregularities still remained is unusable as a product.

On the contrary, the annular original film provided with thick portions according to the process of the present invention is free from the above-mentioned problems and is made as a film which can be satisfactorily used as a product. Moreover, it still has a graceful property (see EMBODIMENT 1) as the polyethylene resin. Particularly, the porous film is most suitable to be used as a back sheet or the like of a disposable paper diaper or the like (see EMBODIMENTS 2 through 7).

That is, although a porous film which has a great strength can be readily obtained only in the vertical direction by the uniaxial roll stretching process or the like, the process of the present invention is effective to obtain a film having well balanced vertical and horizontal strengths (see EMBODIMENT 1). Particularly, it exhibits its effectiveness when the horizontal strength is to be increased. More specifically, when a tape should be replaced in a disposable diaper or the like, it is preferable that the horizontal strength of the film, i.e., the vertical tear strength of the film, as shown in EMBODIMENTS 3, 5 and 7 of table 4, is great. As a result, it is preferable to make a film having well balanced vertical and horizontal strengths. Accordingly, in view of the fact that the vertical tear strength can be easily increased according to the process of the present invention, it has an important use as a process for making a porous film.

In a water-vapor leakage-proof sheet used in a sanitary goods, such as a disposable diaper or the like, if a porous film has a water-vapor of 1.0 g/100 c m$^2$.hr or more which is measured in accordance with JIS Z-0208, this porous film is recognized to have the effect for preventing a swelling when in use. The porous film shown in this embodiment is very satisfactory when used as a back-sheet of such sanitary goods.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A process for making a crack resistant film having a uniform thickness, improved flexibility and balanced strengths comprising the steps of:

forming a film of non-uniform thickness having an annularly shaped configuration from a composite material of a thermoplastic resin composition according to an inflation process such that said annular film has at least two thick portions opposite from each other within said annular shaped film, said thick portions being distinguishable from a remaining thin portion of said annular shaped film;

converting said non-uniform thick annular film into a flat shaped configuration by folding or collapsing said annular film such that said at least two thick portions are located substantially at opposite ends of said flat shaped configuration of said film;

clamping said flat-shaped film by said thick portions by a clamping portion of a stretching apparatus;

stretching said clamped flat-shaped non-uniform thick film so as to produce a uniformly thick film of said thin portion; and removing said thick portions to produce said uniform thick film from said non-uniform thick film.

2. A process for making a film as in claim 1, wherein thickness of said thick portions is greater by at least 110% than thickness of said thin portion.

3. A process for making a film as in claim 1, wherein said composite material contains a filler selected from at least one of an inorganic material and an organic material.

4. A process for making a film as in claim 3, wherein said composite material contains said thermoplastic resin in an amount of about 100 wt. parts and said filler in an amount of from about 30 to 500 wt. parts.

5. A process for making a film as in claim 3 or claim 4, wherein an average particle diameter of said filler is 30μ or less.

* * * * *